(12) United States Patent
Rajasingham

(10) Patent No.: US 10,423,295 B1
(45) Date of Patent: *Sep. 24, 2019

(54) COLLABORATION SYSTEM ON MOBILE NETWORK

(71) Applicant: Arjuna Indraeswaran Rajasingham, Bethesda, MD (US)

(72) Inventor: Arjuna Indraeswaran Rajasingham, Bethesda, MD (US)

(*) Notice: Subject to any disclaimer, the term of this patent is extended or adjusted under 35 U.S.C. 154(b) by 782 days.

This patent is subject to a terminal disclaimer.

(21) Appl. No.: 14/203,088

(22) Filed: Mar. 10, 2014

Related U.S. Application Data

(63) Continuation-in-part of application No. 13/694,996, filed on Jan. 24, 2013, which is a continuation-in-part of application No. 10/790,151, filed on Mar. 2, 2004, now Pat. No. 8,386,301, application No. 14/203,088, which is a continuation-in-part of application No. 11/730,161, filed on Mar. 29, 2007, now Pat. No. 9,063,633.

(60) Provisional application No. 60/450,682, filed on Mar. 3, 2003, provisional application No. 60/787,444, filed on Mar. 30, 2006.

(51) Int. Cl.
| | |
|---|---|
| *G06T 19/00* | (2011.01) |
| *G06F 3/0481* | (2013.01) |
| *G06F 3/0484* | (2013.01) |
| *H04L 29/06* | (2006.01) |

(52) U.S. Cl.
CPC ...... *G06F 3/04815* (2013.01); *G06F 3/04842* (2013.01); *G06T 19/003* (2013.01); *H04L 67/38* (2013.01)

(58) Field of Classification Search
CPC .............................. G06T 19/003; H04L 67/38
USPC ............................................. 705/7.23; 345/8
See application file for complete search history.

(56) References Cited

U.S. PATENT DOCUMENTS

| | | | |
|---|---|---|---|
| 6,271,842 B1 * | 8/2001 | Bardon | G06F 3/04815 |
| | | | 715/848 |
| 7,043,225 B1 * | 5/2006 | Patel | H04L 12/14 |
| | | | 455/404.2 |
| 2003/0037101 A1 * | 2/2003 | Torabi | G06F 3/011 |
| | | | 709/203 |
| 2003/0236985 A1 * | 12/2003 | Ruuth | G06F 21/35 |
| | | | 713/173 |
| 2004/0138901 A1 * | 7/2004 | Krieger | G06Q 30/02 |
| | | | 705/1.1 |
| 2004/0193441 A1 * | 9/2004 | Altieri | G06Q 30/02 |
| | | | 709/203 |

OTHER PUBLICATIONS

Halo: Combat Evolved, Nov. 15, 2001, IGN (www.ign.com/games/halo-combat-evolved/xbox-15922).*
The Game: Halo 1 LAN Party CTF (https://www.youtube.com/watch?v=VhjWnJU2EKY).*

* cited by examiner

*Primary Examiner* — Nadja N Chong Cruz

(57) ABSTRACT

A mobile computer network for the navigation among and transfer of context information from remote participants with an enabling Network architecture and related business model.

16 Claims, 11 Drawing Sheets

COLLABORATION SYSTEM ON MOBILE NETWORK

CROSS REFERENCE TO RELATED APPLICATIONS

This application claims priority from and hereby incorporates herein by reference all of the following applications. Claims priority from U.S. Ser. No. 13/694,996 filed Jan. 24, 2013 as a Continuation in Part which claims priority from and is a continuation in part of Ser. No. 10/790,151, filed Mar. 2, 200, which claims priority from 60/450,682 filed Mar. 3, 2003. Claims priority from U.S. Ser. No. 11/730,161 filed Mar. 29, 2007 as a Continuation in Part and claims priority from U.S. 60/787,444 filed 30 Mar. 2006.

SUMMARY

The present invention provides a network arrangement and related business processes for harnessing the context information of Members in a Network that could be globally distributed. Moreover the Members can be mobile with devices to capture context of the participants. Such context include visual senses in 2-D or 3-D, audio field around the Members, Language parameters, cultural cues. Users are free to navigate among a series of such geographically displaced Members. Such capture may or may not be in real time.

Moreover the invention offers a system for navigation in virtual and real spaces—virtually.

This virtual system comprises a set of interface devices and a unique network that provides a new approach for virtual navigation of physical and virtual environments.

There are two distinct applications for such virtual navigation: First navigation in a virtual field; and second navigation in a real field.

Navigation is in a virtual field would be applications such as hands free navigation in 3-D video games, 3-D computer environments [1017] that have 3D needs as in CAD applications and special 3D interfaces that can speed navigation [1016]. Such virtual 3D fields can also be multi source 3D TV or Motion Picture programming, where the viewer can have some degrees of navigation freedom in the field of view. In some cases such multiple sources can be interpolated or "stitched" to form a continuum of possible points of view in the 3D field.

Navigation in a Real Field would be an application where the 3D virtual navigation with the device in a real 3D field in real time live programming at any location with possibly multiple sources from a network of members. Such members may be Source Members or User Members. The Sources provide live programming and will have one or more "World Camera(s)" (and/or "World microphone sets" for audio mono, stereo or 3D surround fields) that is aimed in the direction of sight of the Source Members to see what these members see. (or hears) Multiple World Cameras or Microphones can give a 3D virtual space rendition. The User Members have interface devices to receive the Source programming and navigation devices to navigate the 2D or 3D field of the programming. Such navigation may be with Mice Joysticks or may use the Intelligent Eye (U.S. Pat. No. 7,091,928) for such 3D navigation directly by using the eyes.

In such virtual navigation of real fields an Active Network of members, Source Members agree to share their programming with User Members. The same member may be both a Source Member and a User Member. Arrangements among such members may be reciprocal or for a fee. While such a network is not necessarily active and may simply transfer information from a source node to a user note, an active Network with distributed processing of video and audio information will in most cases provide the distributed computing resources to enable the operation of this infrastructure.

DRAWING DESCRIPTION

1001—User Member
1002—User Interface
1003—Source Member
1004—Source
1005—Network
1006—World Camera of source member
1007—Icon representing source
1008—Selected Source
1009—Navigate
1010—real time programming
1011—Selected Source
1012—Field of View
1013—Icon to return to Native Field
1014—microphone of source member
1015—Field of view of a Source
1016—Computer generated virtual 3D field
1017—Computer source
1018—Interpolation of fields
1019—Fixed 3D local landscape recreated by moving sources
1020—stitching together of local landscapes and cit-scapes
1021—Real Maps
1022—interpolation of fields of view from sources in network
1023—View points
1024—Fields from view points (location and direction)
1025—landscapes and city-scapes
1026—Moving sources
1027—eye
1028—eye appendages
1029—Gaze
1030—eye blink patterns and other possible signaling possibilities with eye appendages
1031—wireless bandwidth providers (Providers)
1032—Internet
1033—Peer to Peer connection FIG. 1 illustrates the block diagram for a headset/interface.

Figure 5:
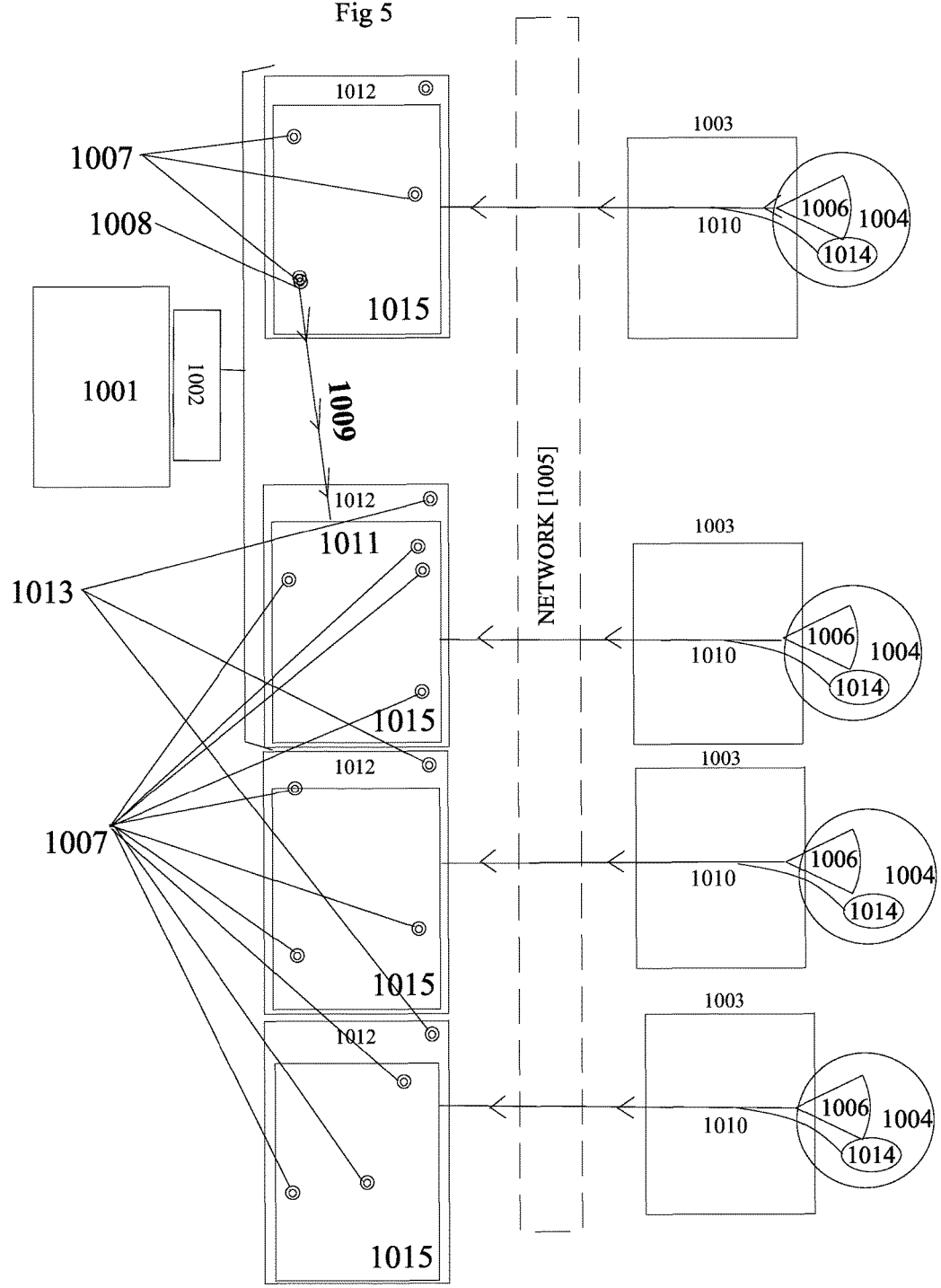

FIG. 5_Representation of navigation [1009] with an icon [1007] in the field of view of a source [1015] to the selected source [1011] in the context of available Sources [1004]

Figure 6:
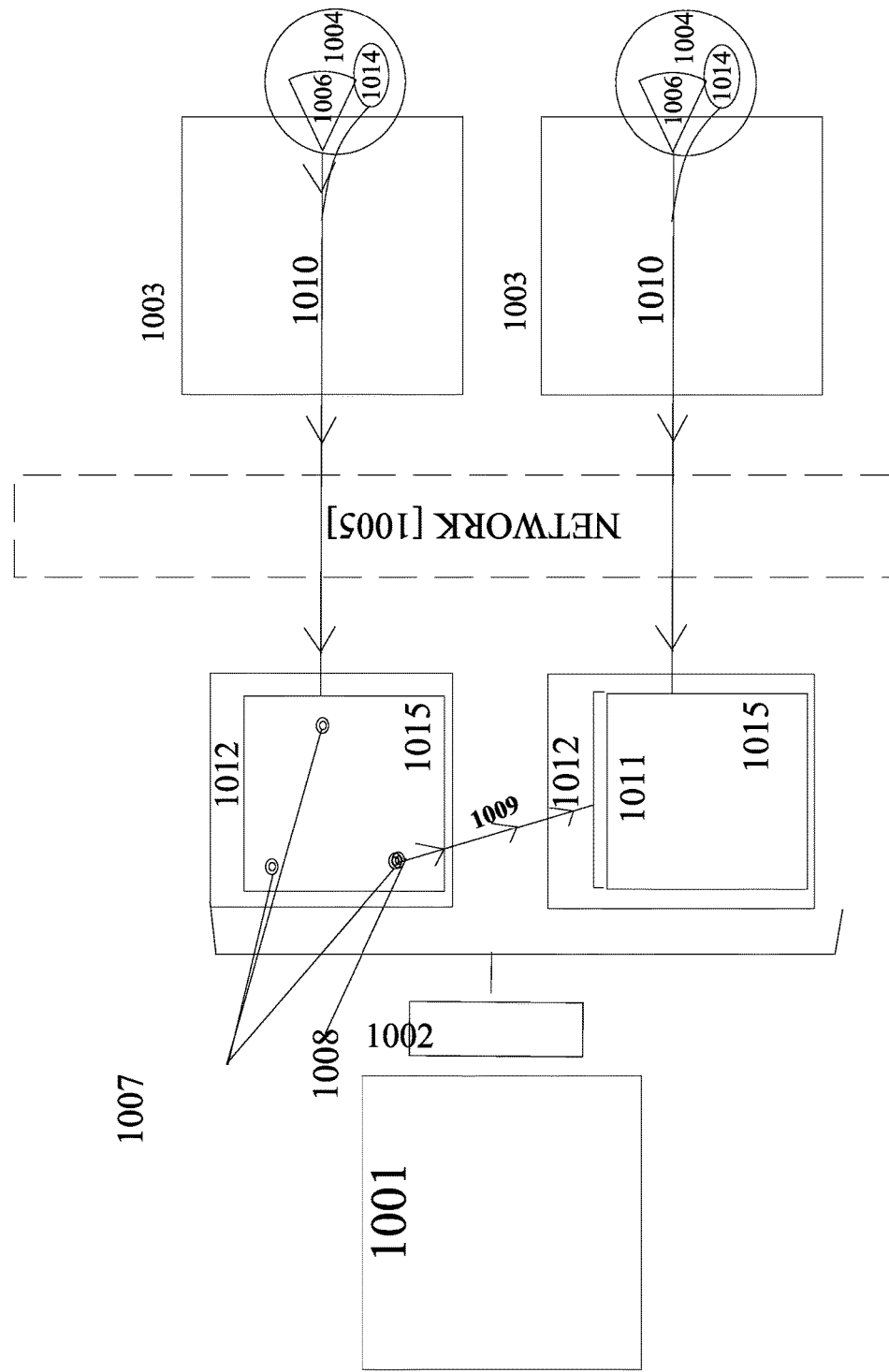

FIG. 6 User member [1001] transition from origin of navigation [1009] field of view of a source [1015] to a destination of navigation [1009] source [1011].

Figure 7:
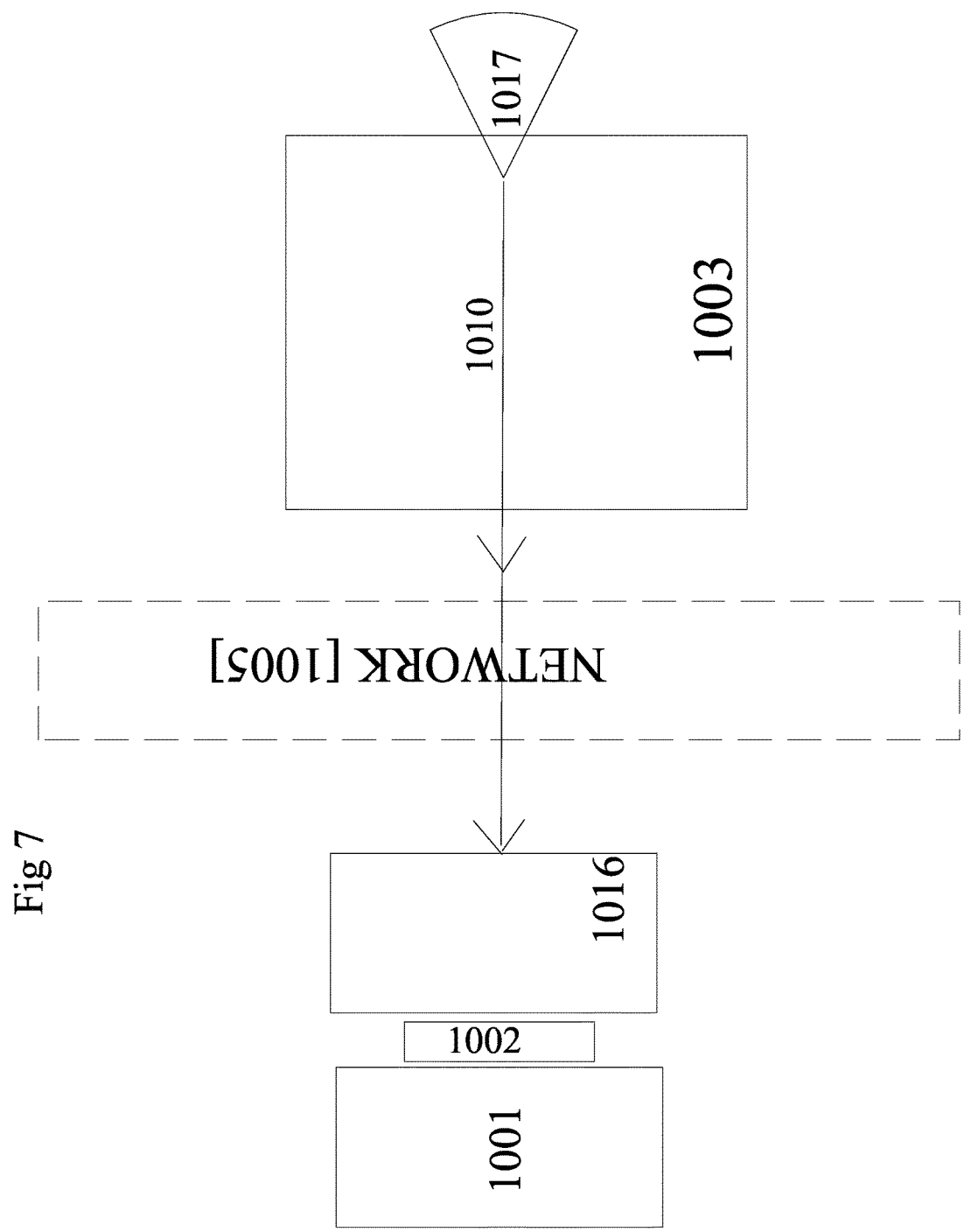

FIG. 7 Representation for Virtual source (Computing Source [1017]) and related field of view [1016]

Figure 8:
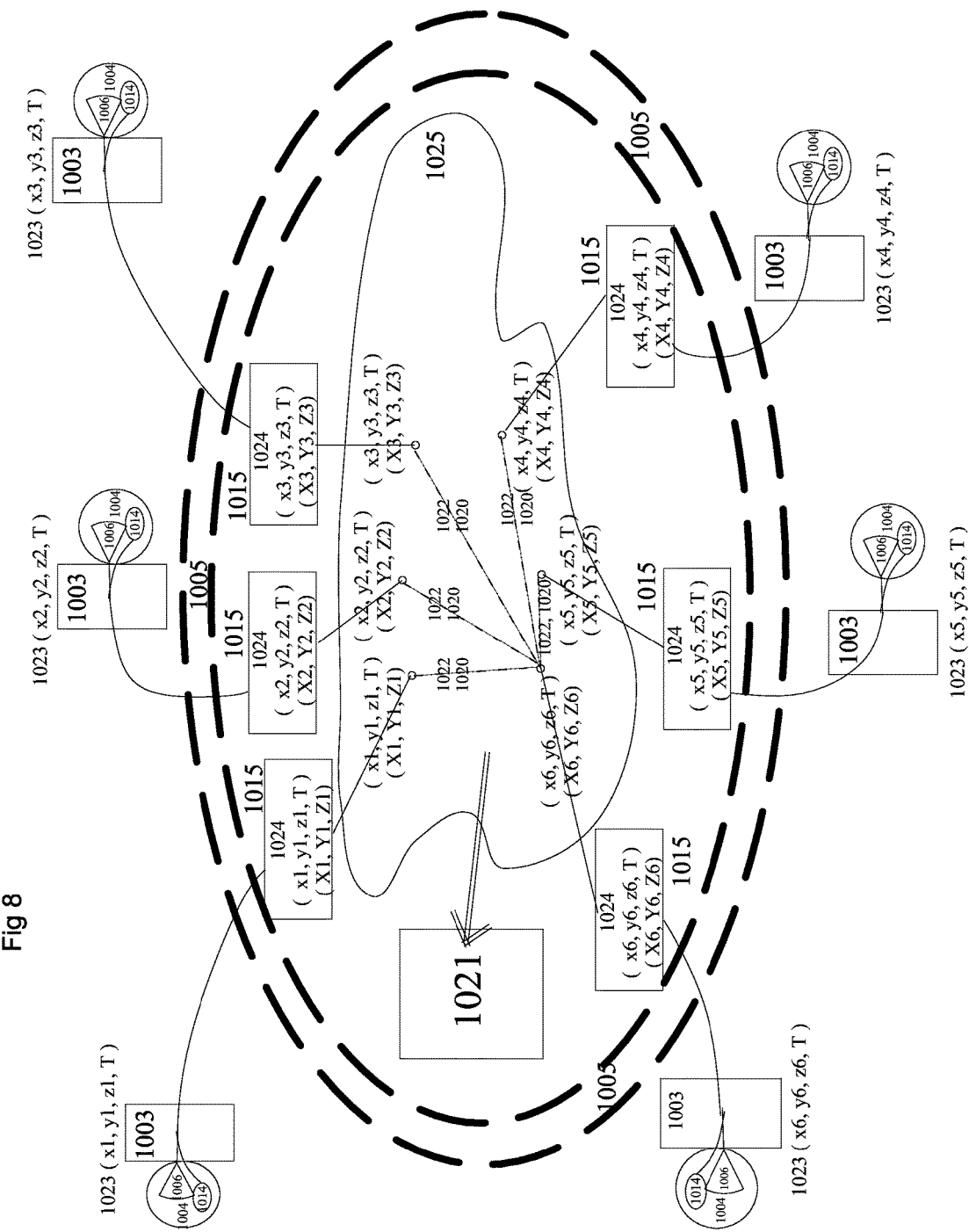
Figure 9:
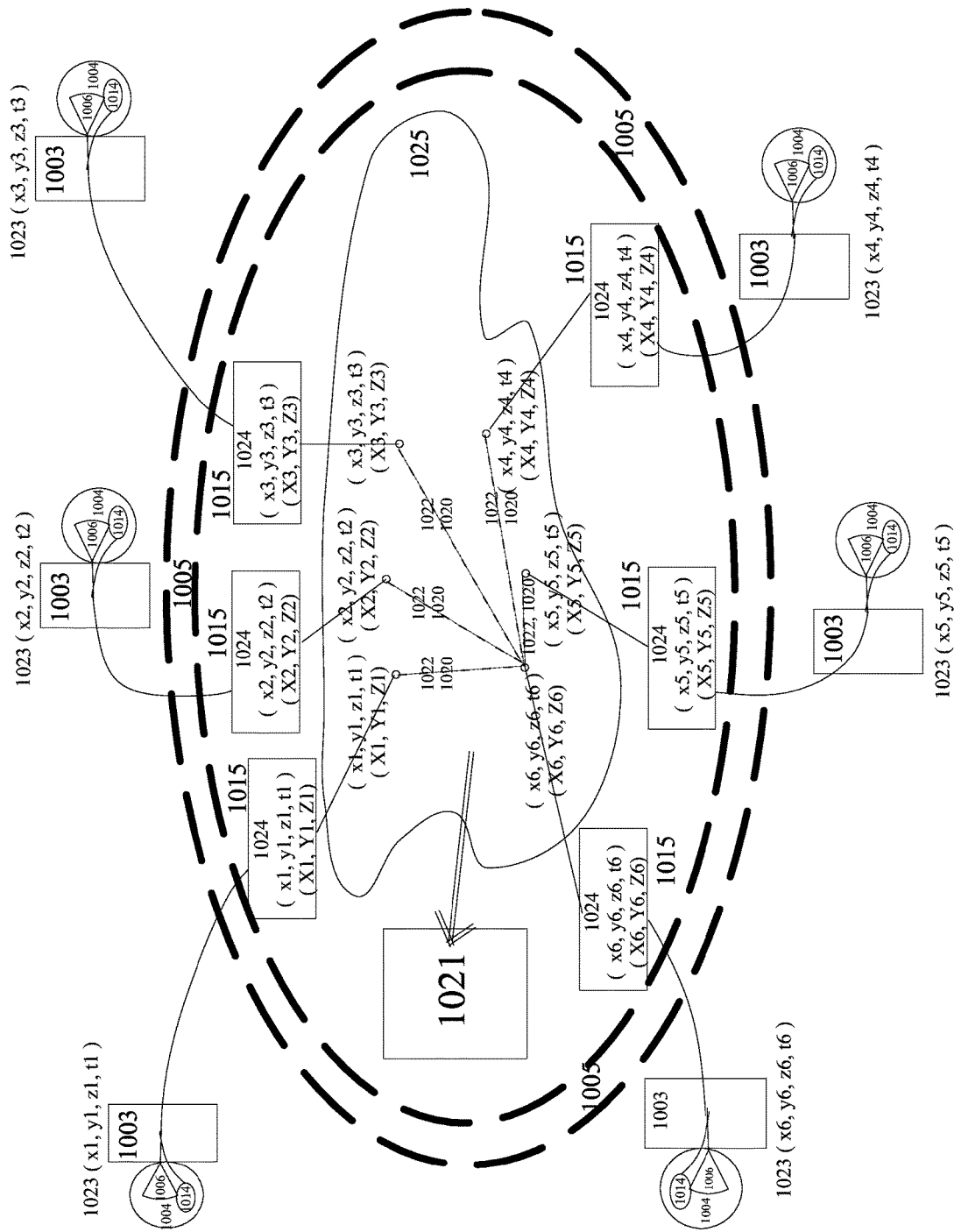

FIG. 8—Creation of real maps [1021] from the interpolation [1018] of the fixed landscapes from multiple Sources FIG. 9—Creation of real maps [1021] from the interpolation of the fixed landscapes from a single Source at different times [1019]

Figure 10:
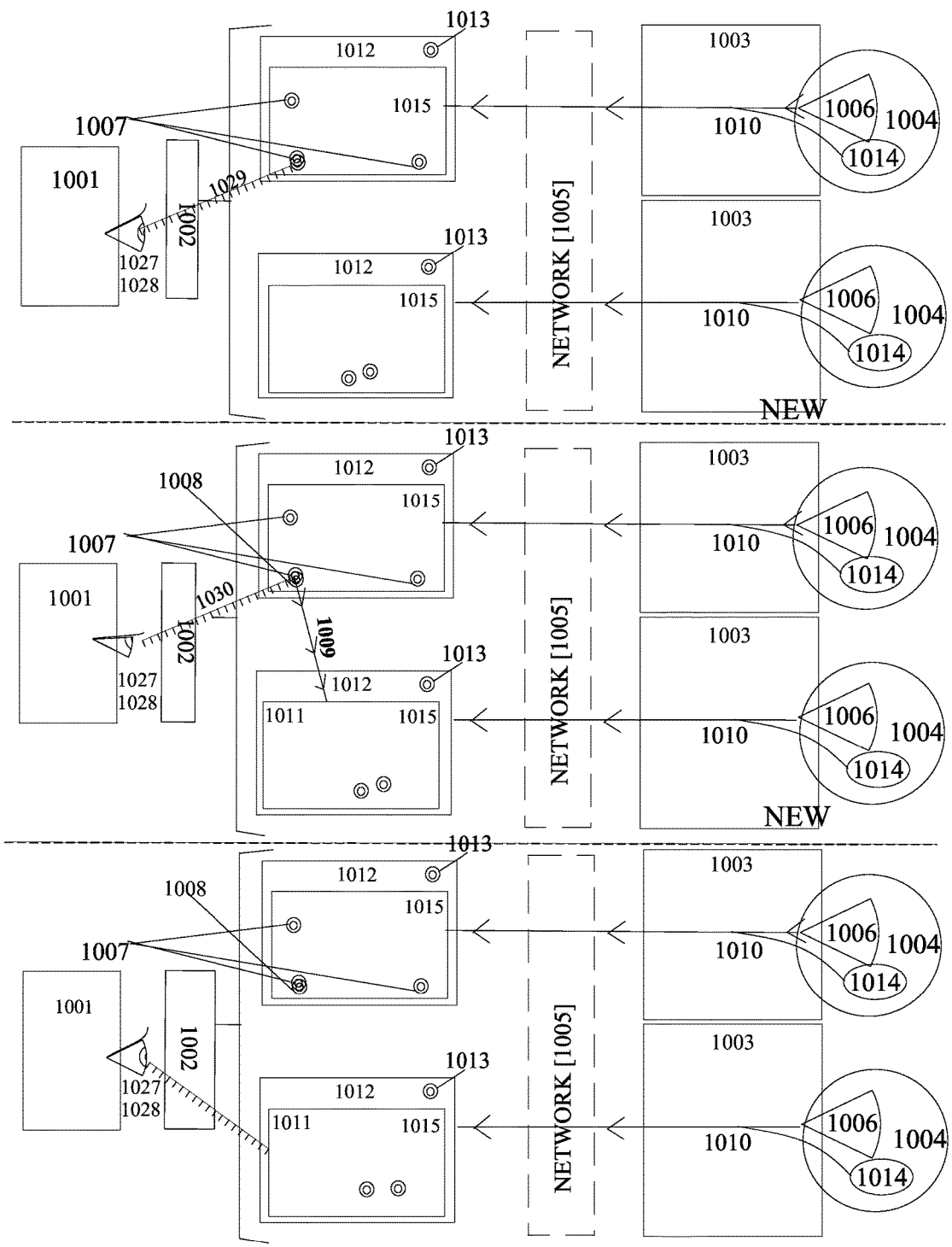

FIG. 10—Selection of icons [1008] for navigation [1009] being enabled by signals from eyes and eye appendages of user [1030]

Figure 11:
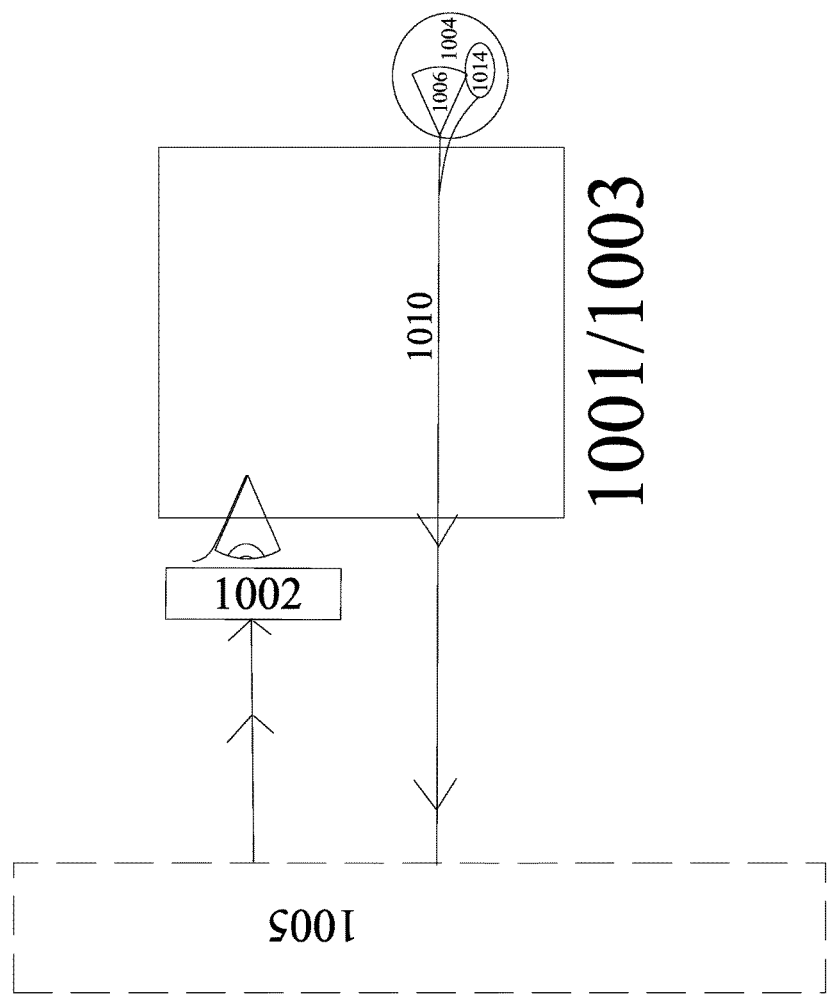

FIG. 11—Same Member is Source Member [1003] and User Member [1001]

Figure 12:
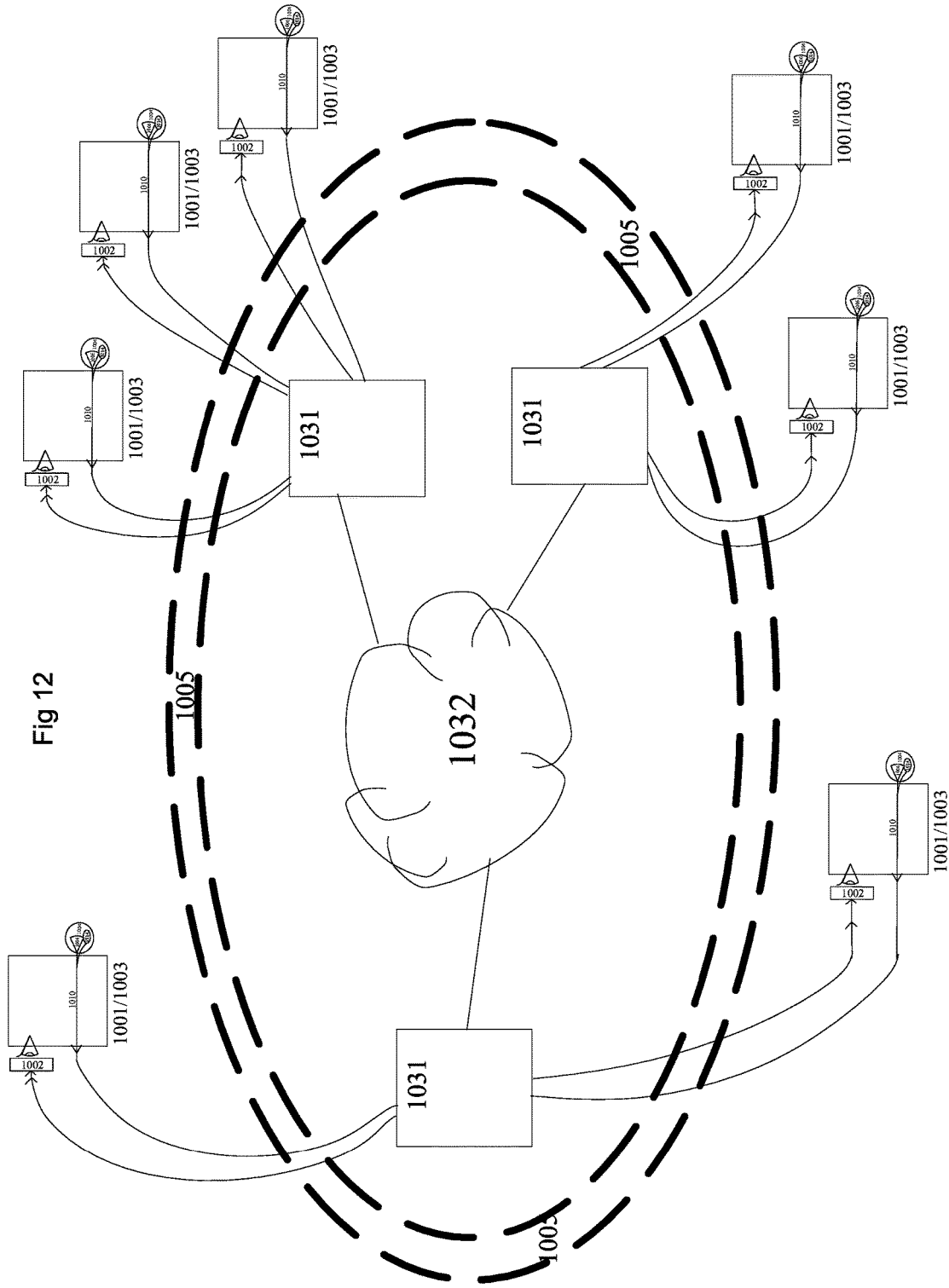

FIG. 12—Normal Network Configuration

Figure 13:
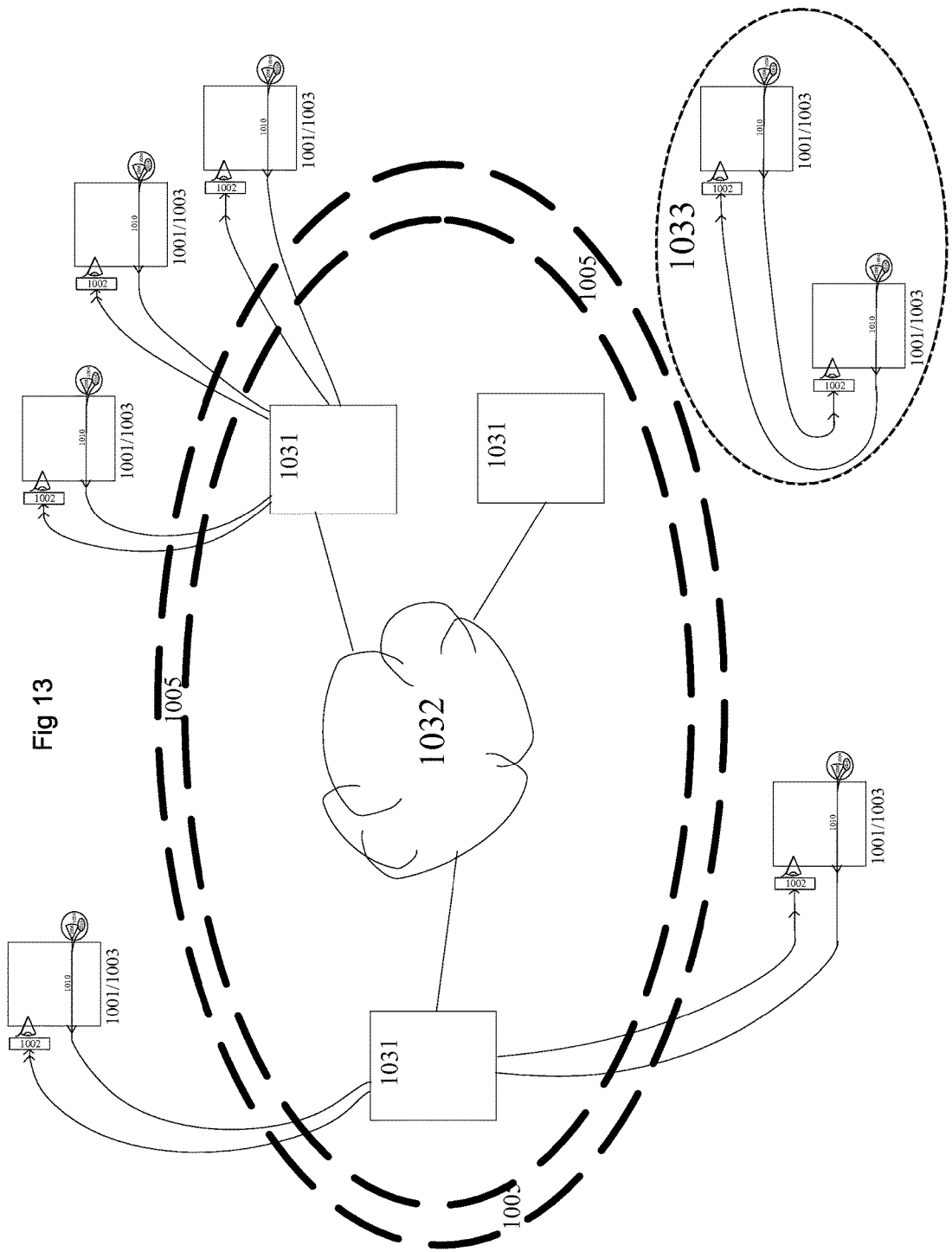

FIG. 13—Peer to Peer [1033] Connection

PREFERRED EMBODIMENT

The Headset/Interface of the User Member/Source Member

The preferred form of the interface [1002] is a universal interface for audio and 3D/2D-video communications for the user. A basic form of the device will have a 3-D or stereo video source providing the native field possibly with dual displays, one or more cameras for tracking the gaze [1029] and eye blink patters and other possible signaling possibilities with eye appendages [1030] of the User, thereby permitting the user to navigate [1009] in the available 3D field. In addition there could be intelligence for interpreting the gaze directions and computing the 3D point of focus. In addition the headset may have the processing required for converting gaze tracking outputs to parametric form in a 3D field.

In addition the device may have a multiple microphone for both voice commands of the user and for the sound field of the user for programming (mono, stereo or surround fields with multiple appropriately placed microphones) and earphones with appropriate sound processing technology for recreating surround sound fields (ideally calibrated to the user anatomy). The field of view [1012] may have icons in 3D that may be selected. One possible icon can be to return to the native field of the user [1013].

Communication of the headset will use one or more standard protocols, cellular or wired network protocols. Moreover the headset unit may have one or more clients and protocols for interface with different kinds of hosts and switching software to meet the communications requirements of the user.

For example the headset may comprise clients and protocols for multiple functions such as computer interface for inputs and outputs for 2&3-D navigation, audio I/O; Email and browser clients for TCP/IP and other internet protocols, interface for a wearable computer or storage device (which may have the same communications clients and protocols as for other host computers) with navigable MP3 or other music and video files for playing and recording by the universal interface. Examples of possible protocols are Wifi protocols, 802.11, Blue tooth, GPRS, EDGE, satellite protocols and revisions and improvements on these.

There may also be clients and protocols to connect directly with other users in the local neighborhood of the user for peer to peer connection [1033] without channeling through the Network. For communication in the local peer to peer network or the Network, when any of these hosts are in the range, in this embodiment connection will be preceded by a command from the user and authentication to be a part of a "trusted" network at some predetermined level for the user. Another example of such local peer to peer network using well known mobile ad-hoc networks without the need for entering the internet gateways.

Ergonomic and comfort conditions could make it desirable to locate the heavier parts of the head set at the base of the head/neck and derive additional support from the ears. There may or may not be a need for contact with the front of the face or the nose bridge as in conventional headphones in these embodiments.

In the stand alone environment the Headset will be used with computers or other conventional devices as a user interface where the use of eye [1027] and eye appendages [1028] navigate (Vclicks) to and select locations in the field. These may be 3-dimensional fields. In the case of 3D navigation the headset may be used for navigation with the eyes in 3D video games, 3D motion picture programming (stereo or synthesized with parallax information from moving objects). Moreover with multiple source cameras the user may move in the video field to different points and related perspectives, thereby offering a new paradigm in programmed entertainment and Motion pictures.

In addition the User Member may be a Source Member of a Network and would therefore have the apparatus for this. The device headset may therefore have a_pair of cluster "World" cameras [1006] pointing in the direction of the face of the user (field of view of the User) to capture 3D video inputs for use of the Source Member for distribution on the Network., or recording on a local device as off-line programming.

Wearable Computer

This embodiment will also have an organizer and other basic personal mobility resources. The preferred embodiment will also have a wearable computer that can be accessed by the universal interface using one of the wireless protocols for communication to databases computing capabilities and large MP3 and other audio files and video files for playback by the interface. The wearable computer may also be synchronized to the databases on the universal interface.

The Network

The Network provides multiple Sources for real time video at known physical locations derived from Source Members in the Network, thereby enabling members of the network to navigate[1009] among these source points and even to interpolated points between them. Considering that source points may be moving such movement will provide additional information for the reconstruction of fixed objects in the local 3D space of users in any local neighborhood. This invention captures and utilizes the unique feature of common human movement in a near horizontal plane and the spacing of the eyes which are also horizontal to recreate stereo imagery and thereby recreate 3D fixed landscapes.

Another approach well disclosed in the background art is the use of distance sensing devices to correlate distance to a field of view to establish depth maps and thereby recreate a landscape. A source of a source member may have such distance measuring devices using sound, laser or infrared spectra/other spectral components of light.

Therefore a User Member [1001] may choose a physical location or a special interest location and the Network [1005] will locate Sources in that location [1004] that will appear for selection by the User on the interface. This may be in the form of icons [1007] in a 3D field of real time programming [1010] derived from a Source. I.e. The field of view of a Source [1015] that is available from the World Camera may have icons representing the locations of other Source Members that the User Member can select [1008] and "hop" onto [1009]. The locations of these Members may be determined by the Network using GPS or triangulation methods with radio connections and many other well established approaches in the background art. Selection of other Sources by the User Member may be by clicking or V-clicking on the desired Source. This action will transfer the User Member to the Source World Cameras and microphones of the selected Source Member [1011]. Such navigation may be induced by visual or audio stimuli from the currently selected Source Member.

For example the preferred embodiment can be used for interactive access to real video (and audio) fields through the Network. To enable such access the device will have a menu that can select a local environment (some of these can be on a list of bookmarks or can even be on the native environment) and the resulting displayed field will show a starting point as requested and several Sources that may be color coded for accessibility, cost, and quality where the user can navigate to and select with a V-click. On selection, the user video display shows the perspective of the selected Source and the user will passively follow the Source unless the Source has wide angle or cluster World Cameras with the Active Network enabled to pan and zoom in this field, in which case the user has some navigational freedom even within one Source. However, the remaining nodes may still be displayed for further selection and navigation thereto. (there will be menu options to turn off these node displays as well).

The user can therefore hop from one Source Member to another and see (and hear if enabled by Source Member) the perspective of the Source. In addition if enabled by any given Source Member (usually for a fee) interactive dialog with the Source Member and even requesting the source Member to "Show" a preferred field of interest. Some networks may be enabled to have sub-networks that are limited to Trust Networks that are established typically by pair wise selection of Members to form chains and a network therefrom. This Network can be implemented by techniques well established in the background art such as VPNs. The structure of such Trust Networks is disclosed in U.S. Ser. No. 13/694,996; 10/790,151; 60/450,682 which are all incorporated herein by reference. A User can therefore navigate through a sub-network that comprises Source Members that are trusted and therefore provide reliable context information over and above the direct video and audio stimuli from their Source interfaces. As disclosed in the above references, trust can be established by iterative all pairwise establishment of trust members in the network which serves for future reference while navigating. Considering that context includes language and gestures among other cues, the Network may in some embodiments have members that provide translation services to the users in real time. Such utility providing members may also give users context information such as gestures for interpretation of the Source members and the related source content. Considering that distributed computing resources could be available on the network, machine translations could be provided to source members. In some embodiments such machine translations could be first voice recognition for conversion to text, machine translation of text to the User member language, and then read out software to read out the content for the User member in the user member's language. All this can be done in real time. Therefore in navigation to distant, or unfamiliar places the User member may have a context that is familiar with language translations, and gesture interpretations among other cues that can be interpreted for the User member by utility members on the network.

This will amount to virtual navigation in a real field.

The Network may be hosted in part by a community of distributed wireless hub providers and other network resource providers. Who (possibly for a fee) provide local wireless bandwidth and other hub intelligence and link into the internet [1032]. Such an infrastructure with distributed resources will also enable the high computational needs for reconstruction of 3D local neighborhoods and video processing bandwidth.

The infrastructure of this invention enables new approaches for TV programming with access for viewers to navigate in the real environments of interest in news or documentaries and even interview (possibly for a fee) the Source members of choice in the relevant local environment.

Some embodiments of the network may have specialized computing resources that hang off the Internet with Gateway locations geography positioned to provide local support for computation for source members in that local region. Such specialized computing resources on the network may be used for the creation of local maps some in three dimensions created from the motion of the source members and their respective sources, translation services in real time another utility providing resources for the local region. These services can all be provided for a fee. Mapping services for example can't be integrated by an integrator for a larger region or globally with information of each local region provided for a fee.

The Network in the preferred embodiment will comprise a distributed network of wireless bandwidth providers (Providers) [1031] that for a fee from the Network administrator will provide bandwidth locally to User Members that are a part of the Network. User Members will pay for bandwidth. bandwidth can be hot spots in a local region within a city where many such local regions provide "cellular" coverage for neighborhoods and even cities. These may be substituted for or supplemented with conventional cellular bandwidth with standard billing to the administrator and indeed satellite bandwidth in remote locations. The Providers may be required to have installed in their hubs the computing infrastructure to stitch together the available Sources in the local neighborhood and have the intelligence to accept and hand off dialog with Sources/Users as they move through local neighborhoods. Providers in this preferred embodiment will initially provide bandwidth for a fixed fee set by the Active Network Administrator, and then after the initial probation period set a rate based on the market. Local providers will compete for providing bandwidth. Users will have options in selecting lowest cost or highest available bandwidth (and quality) options when selecting the Providers. Such bandwidth selection may be a background process that is set by the User. Users may select from multiple Providers (which may be other Users or Sources) based on possible fees such Providers may charge through a Network Administrator. This arrangement forms a new Business Model for Distributed Bandwidth.

An additional embodiment incorporates stitching algorithms for interpolation of fields [1018] available in the Network as source nodes [1022] of other users, thereby giving the user a continuous or near continuous range of view points [1023] and fields [1024] even between the available sources. As the Sources are moving [1026] the Active Network can recreate the fixed 3D local landscape [1019] and use that video information for interpolation for navigation of users. Such stitching together of [1020] local landscapes and city-scapes [1025] can allow User Members to physically navigate from available Source Users in one local neighborhood to another using "Real Maps" [1021] created by this interpolation of the fixed landscape. While such interpolation will not be able to give perfect views, the user has the choice of using the available Source nodes or an interpolation or a combination for zooming out to encompass a wide panorama. Such interpolation processing may be enabled by distributed processing on the Active Network given the computing resources needed for each of the neighborhoods.

The Network will need intelligence to locate the physical location of the sources. These can be done in some embodiments with GPS and in others simply using triangulation from the transmit points of the sources to the recent hubs or host devices that the device has latched onto recently.

If interpolation algorithms are used these will also have interpolated locations from the source locations.

To supplement this, there are well established web based approaches to find physical locations of sources on the internet.

Applications of Network

All the above functionality enables the use of this infrastructure to create virtual tours and expeditions to remote parts of the world or places of interest, where the "tour guide" is a Source Member, that for a fee travels to or through a local neighborhood with User Members selecting (on the Network) the Tour guide's Source.

The nature of documentary and News programs will be transformed by the use of the Active Network and Sources as a verification source and a source of additional information in real time, available in the local environment of the Issue and location of interest. For a fee User Members may even interview first hand the Sources in situ for example in Breaking News. A new concept of verifiable "truth" media is enabled with this invention where Users of the Network can travel virtually to any part of the globe where there are Source Members and discover the reality of news coverage themselves using the "World Cameras" and World Microphones of Source Members. In addition eye witnesses can provide video programming for conventional and off line News coverage. Source Member groups can emerge to provide debates on events as they saw it with verifiable video programming from their World Cameras and Microphones. These Groups can be available on-line on the website of the Network.

Virtual parties and meetings. The invention enables User members to join parties and gatherings of Source Members and hop from the "eyes" of one Source Member to another.

One of the unique characteristics of the video Network is that location of the Sources are relevant for content unlike conventional media such as mobile phones and Network based phone services. Moreover, this invention enables navigation in that video field which is a new and unique characteristic of this invention.

Alternative Embodiments

The virtual navigation system may be used to navigate in 2D visual or in text based lexicographic or other ordering of Sources. The Stimuli from the Sources may be Audio or Visual or both and may be mono (audio), 2D or 3D/Surround for audio and Visual.

Some embodiments may utilize either live or programmed 2D video data to synthesize 3D fields by using time lagged images to create parallax information from objects identified with object recognition algorithms.

This is possible because Source Members in most situations move in a horizontal plane and the spacing of the eyes are also horizontal. This invention utilizes this unique combination of these two factors to use the data from a single camera to synthesize 3D fields and fixed landscapes, thereby in combination with other Members generate 3 D Maps for use by other Members.

A simple alternative embodiment of the User/Source interface for 2D video is a Computer or a mobile/cell phone (with cameras for Source functionality) The headset in an alternative embodiment may be similar to conventional eye glasses supported on the nose bridge and ears.

A fixed wired interface adapter may be used to interface between the wireless Universal Interface and conventional video game consoles and computers with only conventional controller outputs/inputs.

A split mobile unit is an alternative embodiment where the functionality of the device is split between a light headset and a connected wearable interface (wired or wirelessly). Here the headset—here has only interface functions. Wearable computer has all data and computing functions.

The headset embodiment may have minimal componentry on the headset to lower weight and offload much of the processing to a wire connected or wireless connected wearable interface. One possible embodiment would have a pair of cameras for gaze and eye tracking, a microphone and the processing required for gaze tracking outputs in parametric form along with one or more audio channels for voice commands and communication. There will also be earphones for one or both ears.

An alternative to the headset/interface is a fixed device with a 3D projection device and cameras to track gaze and the eyes along with a microphone. It is an alternative to the mobile version and may also used wired Internet connections for the user.

Additional Embodiments

Figure 3:
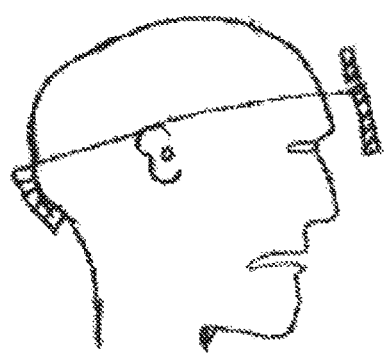
FIG. 3 shows the headset supported by the ear and the external occipital protuberance.
Figure 4:
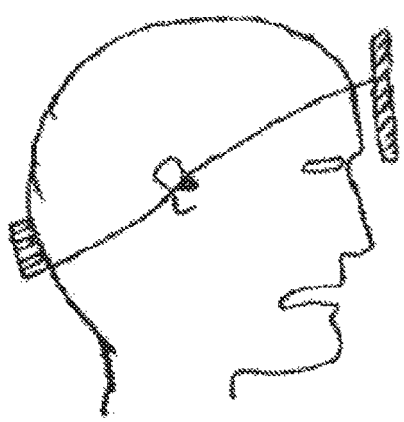
FIG. 4 shows the headset supported by the ear canal or possibly the bone orifice of the ear.

Ergonomics of the Headset:

Support on the ear (5—FIG. 3), and/or the ear canal (7-FIG. 4) and possibly the bone orifice of the ear (7-FIG. 4). Considering that a significant portion of the weight of the headset (2-FIG. 3, FIG. 4) will be in the front of the head, the rear of the headset may be used to contain heavy components to balance out the load. If the rear section is lighter than the front section the had set may rest on the External occipital protuberance (6—FIG. 3, FIG. 4) and allow articulation of the head at the occipital condoyle without significant disturbance of the headset position.

Figure 1:
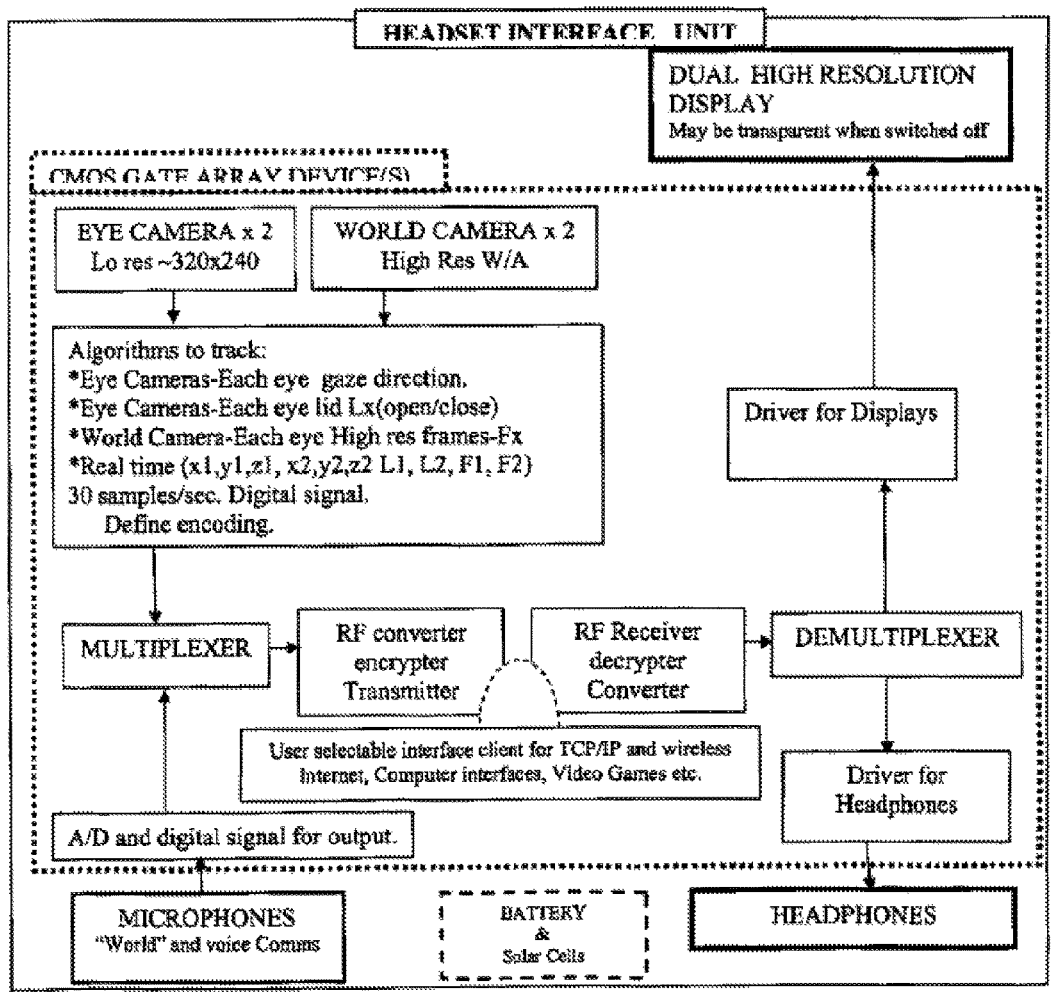
Figure 2:
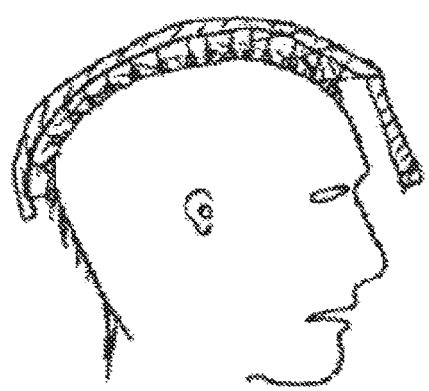
FIG. 2 shows the Headset with a large number of soft headed thin fingers to support on the scalp.

Considering that many users of the headset (2—FIG. 2) may not wish to have their hair compressed with a fitted helmet, another design allows for a large number of soft headed thin fingers (1—FIG. 2) that touch the scalp (3-FIG. 2) through the hair (4—FIG. 2). The impact on hair will be not much different to a comb. Moreover, such a design will provide excellent ventilation in a helmet design.

Hardware on Headset

Rear view camera: Particularly when the module with all the heavier componentry is located at the base of the head at the neck, there are synergies in having a rear view "World" camera as well on the module.

Wide angle or multi camera World with network directional intelligence

The World cameras may be wide angle or clusters to give a broader field of view for network members, along with network intelligence to navigate within the panoramic filed data.

Outdoor version-solar cells/cap on sun shield: Solar cells will reduce the physical load of batteries on the head and synergistically provide protection for the user.

For use in remote locations—satellite antenna: Satellite antennae can be attached to the sun shield/cap independently of or incorporated with the solar cells.

Visual displays—transparent option: To allow for real navigation in the native real space (!) the Visual display may have the option to become transparent or semi transparent.

Pan & Zoom on "world cameras": Pan and zoom capabilities in the World Camera will give in a 1-1 arrangement between a User and a Source (usually for a fee) the ability to orient the camera tot the desired field within the available Source hardware.

Audio/Video Player data: The Audio and video files may be stored on the device rather than on a wearable computer or remotely.

Organizer: May be on the Interface device rather than on a wearable computer.

Computer: The headset may include a basic computer with related functionality for stand alone use.

The invention claimed is:

1. A Business System utilizing a system for virtual navigation of a real space, adapted for use by a User Member comprising:
   a user interface with a display, wherein said User Member is connected with at least one communication protocol, to an Active Network hosted by computing resources, to enable a virtual navigation infrastructure for a real space comprising a plurality of Sources, wherein said infrastructure is enabled by at least one of internet and cellular networks with at least one digital communications protocol; said system adapted for use by a plurality of Source Members with each Source Member adapted to use at least one of said Sources, each comprising one or more cameras:
   wherein each of the Sources are at Source Points;
   wherein said Source Points are configured to move;
   wherein locations of each of said Sources is determined by the Active Network;
   wherein a first field of view of one of the at least one Source adapted for use of the plurality of Source Members comprises a plurality of icons representing locations of other Sources for selection of said Sources;
   wherein selection of the locations of said icons available for selection in said first field of view of one of the at least one Source adapted for use of the plurality of Source Members, is the selection of the locations of their corresponding Sources;
   wherein said virtual navigation from a First Source to a Second Source comprises presentation to the User Member, of visual stimuli provided by the Second Source with the Network, and wherein stimuli comprising a field of view provided by the First Source with the Network comprises selection points in the field of view of the First Source in a direction of the locations in that field of view of Sources, wherein organization and presentation of navigation points in a visual locational context of the field of view of the First Source provides assistance with cognitive resonance to the User Member for relative virtual transition in that visual context to the field of view and location of the Second Source, and wherein said navigation to locations of selection points of Sources in the field of view comprises the selection by the User Member of the selection point comprising an icon at the location of the Second Source on the field of view of the First Source which comprises icons at the locations of Sources available for selection.

2. A business process method for virtual tours utilizing the system of claim 1, wherein the Source Member of a Network is a tour guide and User members are participants and the Source Member derives revenue from the User Members.

3. A business process method for news media utilizing the system of claim 1, where User Members are consumers of news and Source Members with one or more Sources are in a local neighborhood of a breaking news and visit a scene of the breaking news and thereby allowed the User Member to experience the stimuli from their one or more Sources.

4. A business process method for documentary utilizing the system of claim 1, where User Members are consumers of documentaries and Source Members with one or more Sources are in a local neighborhood of the scenes of interest for the documentary visit the scenes of interest for the documentary and thereby allow the User Members to experience the stimuli from their Source.

5. A business process method for computing in a Network, utilizing the system as in claim 1, wherein said Network provides computing resources for a fee from at least one computing resource provider to enable a creation for a use of a User Member Context transformation data comprising at least one of: Language translation; gesture translation; emotional context translation.

6. A business process method for computing in a Network, utilizing the system as in claim 1, wherein said Network provides computing resources for a fee from at least one computing resource provider to enable a creation for the use of a User Member real maps created by an interpolation of fixed landscapes from one or both of: the stimuli provided by a plurality of Sources and their physical locations; and the stimuli provided by video data of at least one Source and its time based locations.

7. A method for enhancing one or both of news stories and virtual tours, using the system for virtual navigation as in claim 1, wherein said system is adapted to one or both of: enhance news stories; and virtual tours, and are enabled by the User Member interviewing the Source Members and consuming the corresponding stimuli provided by the one or more Sources of the Source Member.

8. A business process method for distributed networking services, utilizing the system as in claim 1, wherein said Network is adapted to provide bandwidth for communication between Source Members and User Members, and wherein said bandwidth is provided for a fee by a plurality of wireless hub providers that are enabled to connect with one or both of Source Members and User Members when said one or both of said Source Members and User Members are in a local neighborhood of said bandwidth providers, said bandwidth providers having connection to one or more communications media that includes at least one of: Mobile Ad-Hoc Network protocols; internet protocols; cellular phone protocols; WiFi protocols; BlueTooth protocols, and wherein said wireless hub providers may charge the User Members a fee for a use of their bandwidth.

9. A business process method for computing in a Network, utilizing the system as in claim 8, wherein a Mobile Ad-hoc Network is a sub-set of the Network and computing resource providers.

10. A business process method for computing in a Network, utilizing the system as in claim 9, wherein said computing resources are enabled to create from Source data, local 3-D maps.

11. A business process method for computing in a Network, utilizing the system as in claim 10, further comprising computing resources on the Network for integrating local 3-D Maps together.

12. A business process method for computing in a Network, utilizing the system as in claim 9, wherein the Mobile Ad-Hoc Network has one or more internet gateways.

13. A business process method for collaboration of Members using the system of claim 1, wherein the Network as at least one Trust sub-net that is secured for an exclusive and secure use of a set of mutually trusting Source and User Members.

14. A business process method for collaboration of Members using the system of claim 13, wherein said trust relationships between said Members of the Trust sub-Net are established by pair-wise confirmation of trust relationships between members, said pairwise relationships chained to all members of the Trust sub-net.

15. A Business System of claim 1, further comprising a social network adapted to serve User and Source members organized for networking, comprising a Professional Collaboration Network, with a Trust Layer with said members including the User Member and the Source Member, providing the User Member, with a trust measure of a Source Member for an Event Record, implemented using a client-server architecture operating on computing machines:

the client-server architecture comprising:

a database with the pairwise trust linkages between the members of the Trust Layer;

registration system for members in the Member Database in the Professional Collaboration Network, using client screens served by Webservers, wherein registration information includes at least one of contact information; and indication of interest in one or more professional fields;

posting facility for members comprising client screen interfaces served by the Network Webservers of the Professional Collaboration Network, electronic communication comprising trust relationships with other members;

the Professional Collaboration Network comprising a Trust Layer with members;

the Trust Layer comprising Trust Linkages between pairs of its members;

each of said Trust Linkages enabling a Trust Reference provided by said pair of attached members on said Trust Linkage;

a linkage search engine accumulating dialog between pairs of members of the Trust Layer based on electronic dialog there between and constructing Trust Linkages;

the User Member using a screen to search for Events of the Source Member;

said Trust Linkages between said pairs of members in the Trust Layer connected end to end as chains forming one or more Connection Threads of one or more Trust Linkages;

each of said connection threads having no Trust Linkage traversed twice;

each of one or more of said connection threads with a Trust Linkage to the Source Member backward chaining a connection thread from the Source Member;

each of said one or more backward chained connection threads from the Source Member in which said User Member is a linked member, creating a backward chained connection thread from the Source Member to the User Member;

disclosing on a screen to the User Member, one or more members in Trust Linkages in at least one of the backward chained connection threads from the Source Member to the User Member;

forward chaining of the User Member to the Source Member through said disclosed one or more members in Trust Linkages in at least one of the backward chained Connection Threads from the Source Member to the User Member for connecting with the Source Member with established trust measure.

16. A Business System utilizing a system for virtual navigation as in claim 15, wherein:

wherein the electronic dialog between said pairs of members are classified as "+" or references;

wherein an overall references of "+" or is computed from the references of Trust linkage pairs.

* * * * *